(12) United States Patent
Norris et al.

(10) Patent No.: US 7,539,257 B2
(45) Date of Patent: May 26, 2009

(54) CONTINUOUS PHASE MODULATION SYSTEM AND METHOD WITH ADDED PHASE PULSE

(75) Inventors: James A. Norris, Fairport, NY (US); John W. Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 785 days.

(21) Appl. No.: 10/981,811

(22) Filed: Nov. 5, 2004

(65) Prior Publication Data

US 2006/0098753 A1    May 11, 2006

(51) Int. Cl.
*H04L 5/12* (2006.01)
*H04L 23/02* (2006.01)

(52) U.S. Cl. ........................ 375/265; 332/106; 332/112; 332/144; 341/178; 341/179

(58) Field of Classification Search ................. 375/265; 341/178, 179; 332/106, 112, 144
See application file for complete search history.

(56) References Cited

U.S. PATENT DOCUMENTS

| | | | | |
|---|---|---|---|---|
| 4,730,344 | A | * | 3/1988 | Saha ........................... 375/280 |
| 4,995,052 | A | | 2/1991 | Thorvaldsen ................... 375/1 |
| 5,048,058 | A | | 9/1991 | Kaleh ........................... 375/47 |
| 5,570,391 | A | * | 10/1996 | Lin et al. ..................... 375/265 |
| 5,627,856 | A | | 5/1997 | Durrant et al. ............... 375/209 |
| 5,805,640 | A | * | 9/1998 | O'Dea et al. ................. 375/296 |
| 6,466,630 | B1 | | 10/2002 | Jensen ......................... 375/327 |
| 2002/0095594 | A1 | | 7/2002 | Dellmo et al. ............... 713/200 |

FOREIGN PATENT DOCUMENTS

WO     03/036819     1/2003

* cited by examiner

*Primary Examiner*—Curtis B Odom
(74) *Attorney, Agent, or Firm*—Allen, Dyer, Doppelt, Milbrath & Gilchrist, P.A.

(57) ABSTRACT

A signal generator generates a coded or memory waveform having a trellis structure. A modulator is operative with the signal generator for adding at least one phase pulse to the trellis structure of the coded or memory waveform to create a substantially constant envelope modulated signal that increases the transmitted bits per symbol.

35 Claims, 7 Drawing Sheets

CONTINUOUS PHASE MODULATION SYSTEM AND METHOD WITH ADDED PHASE PULSE

FIELD OF THE INVENTION

The present invention relates to the field of communications systems, and more particularly, the present invention relates to communications systems and related methods that use continuous phase modulation and similar modulation schemes.

BACKGROUND OF THE INVENTION

Some multi-band or other tactical radios operate in the high frequency (HF), very high frequency (VHF) (for satellite communications), and ultra high frequency (UHF) bands. The range of multi-band tactical radios can operate over about 2 through about 512 MHz frequency range. Next generation radios should cover about 2.0 to about 2,000 MHz (or higher) to accommodate high data rate waveforms and less crowded frequency bands. This high frequency transmit mode is governed by standards such as MIL-STD-188-141B. UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, which provides a family of constant and non-constant amplitude waveforms for use over satellite links, including calculation for higher transmit power and lower receive noise figures.

The joint tactical radio system (JTRS) has different designs that use oscillators, mixers, switchers, splitters, combiners and power amplifier devices to cover different frequency ranges. These modulation schemes used for these types of systems can occupy a fixed bandwidth channel at a fixed frequency spectrum. The systems usually include a memory of a coded waveform, such as a phase shift keying (PSK), amplitude shift keying (ASK), frequency shift keying (FSK), quadrature amplitude modulation (QAM), or continuous phase modulation (CPM) with a convolutional or other type of forward error correction code, for example, represented as a trellis structure. It should be understood that PSK, ASK, QAM and non-continuous FSK are memoryless modulations. For these modulations to have memory, Trellis-coded Modulation would need to be used for each specific M-PSK, M-QAM, M-ASK modulation type.

Throughout the communication industry, a requirement exists to improve power and spectral efficiency of a given modulation type, such as the PSK, ASK, FSK, CPM and QAM. A current industry standard uses filtering and other methods to eliminate any unnecessary out-of-band energy and improve the spectral efficiency and various forward error corrections (FEC) schemes to improve the power efficiency. Some limitations of these schemes are receiver demodulation complexity and non-constant amplitude.

Commonly assigned U.S. patent application Ser. No. 10/868,430, filed Jun. 15, 2004, and entitled, "Continuous Phase Modulation System and Method With Added Orthogonal Signals," which is hereby incorporated by reference in its entirety, increases the distance property of coded, transmitted bits while taking advantage of any underlying memory (coding) scheme of those bits/symbols that are most likely to be received in error. That type of system is applicable to required modulation schemes that occupy a fixed bandwidth channel (LOS, cable or SATCOM) (fixed frequency spectrum). It takes advantage of the memory (usually represented as a trellis structure) of a coded waveform (i.e., TCM M-PSK, TCM M-ASK, continuous FSK, TCM M-QAM, or CPM with a convolutional (or other type) FEC code) by increasing the bandwidth of the signal and either improving the bit error rate performance or increasing the number of bits which can be encoded into a single symbol.

In that system, the addition of orthogonal or pseudo-orthogonal modulated waveforms (i.e., sin(ft/T), sin(2ft/T), PN spread sequences, etc.) increases the distance property of uncoded, transmitted bits while taking advantage of the underlying memory (coding) scheme of those bits/symbols which are most likely to be received in error. The amplitude modulated waveforms would provide discrimination to differentiate between different amplitude signals. The orthogonal or pseudo-orthogonal signals are added to the signal space of a modulation type to create a new, hybrid signal. The demodulation of this hybrid signal requires some modification to the receiver for optimal performance but does not effect the complexity of the original trellis decoder. Thus, the receiver complexity is not greatly increased. The addition of one orthogonal (or pseudo-orthogonal) waveform to a CPM-encoded signal is advantageous. This hybrid approach could be used with any modulation type which takes advantage of modulation or channel memory. In that system and method, a signal generator generates an encoded waveform, and a modulator adds at least one orthogonal or pseudo-orthogonal waveform to the trellis structure to create a non-constant envelope modulated signal that has increased bandwidth, improved bit error rate, or an increased number of bits encoded into a single signal.

This signal, however, has a non-constant envelope and it is desirable in some cases to add a signal and maintain a constant envelope signal.

SUMMARY OF THE INVENTION

The present invention provides a new constant-amplitude, higher-throughput and lower complexity, continuous phase modulated waveform. The data rate of the continuous phase modulated waveform is increased without incurring a higher complexity coding scheme. The system and method of the present invention provides for the selection of bandwidth and data rate to achieve increased throughput or power efficiency. This solves the desire by some for a waveform that has constant amplitude and is bandwidth and/or power efficient without significantly increasing complexity.

In the present invention, different phase shaping pulses can be used to send additional data bits per symbol. There is no change in the underlying Viterbi decoder complexity and only the metric computation increases by the number of different phase pulses that were added. The bandwidth of the waveform can be varied as a function of the different pulse shapes that are used. It is also possible to choose pseudo-orthogonal phase pulses or other pulse shapes based on the desired spectral properties or power efficiency.

In accordance with the present invention, the system forms a signal with memory. A signal generator or similar circuit generates either a coded waveform or a waveform with memory having a trellis structure. A modulator is operative with the signal generator for adding at least one phase pulse to the trellis structure of the coded waveform and creating a substantially constant envelope modulated signal that has increased bits per transmitted symbol. This phase pulse could comprise at least two pseudo-orthogonal phase pulses. Any phase pulse can be used as long as the start and end position of phase pulses is the same (or modulo 2PI).

In yet another aspect of the present invention, the phase pulse shape is varied to increase the number of bits per transmitted symbol (instead of traditional approach of increasing the symbol alphabet of underlying trellis modulation increasing trellis complexity). An example of system increase from a binary (i.e., 2-ary) symbol to a 4-ary symbol by modifying a first pulse to change from 0 to 1 at the start of a symbol and change the second pulse from 0 to 1 at the end of the signal. This is just an example of two different phase pulses, but many different pulse shapes exist. In order to improve performance, the system can generate a phase pulse that has a shape that increases the correlation metric difference a Euclidean distance spaced apart greater than the square root of two. In addition, the peak point of a pulse can be moved to another sample point on the symbol.

In yet another aspect of the present invention, the phase pulse comprises a raised cosine phased pulse and its complement, and a zero-value for a portion of the symbol time, as a non-limiting example.

In yet another aspect of the present invention, the phase pulse traverses to a value at a midpoint of a symbol and maintains that value for a second half of the symbol. Thus, the modulator can be operative for generating 32-ary or 64-ary modulation order signals. Modulator can generate any arbitrary M-ary waveform such as 4-ary, 8-ary, 16-ary, 32-ary and 64-ary and higher, as non-limiting examples.

A method of the present invention is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
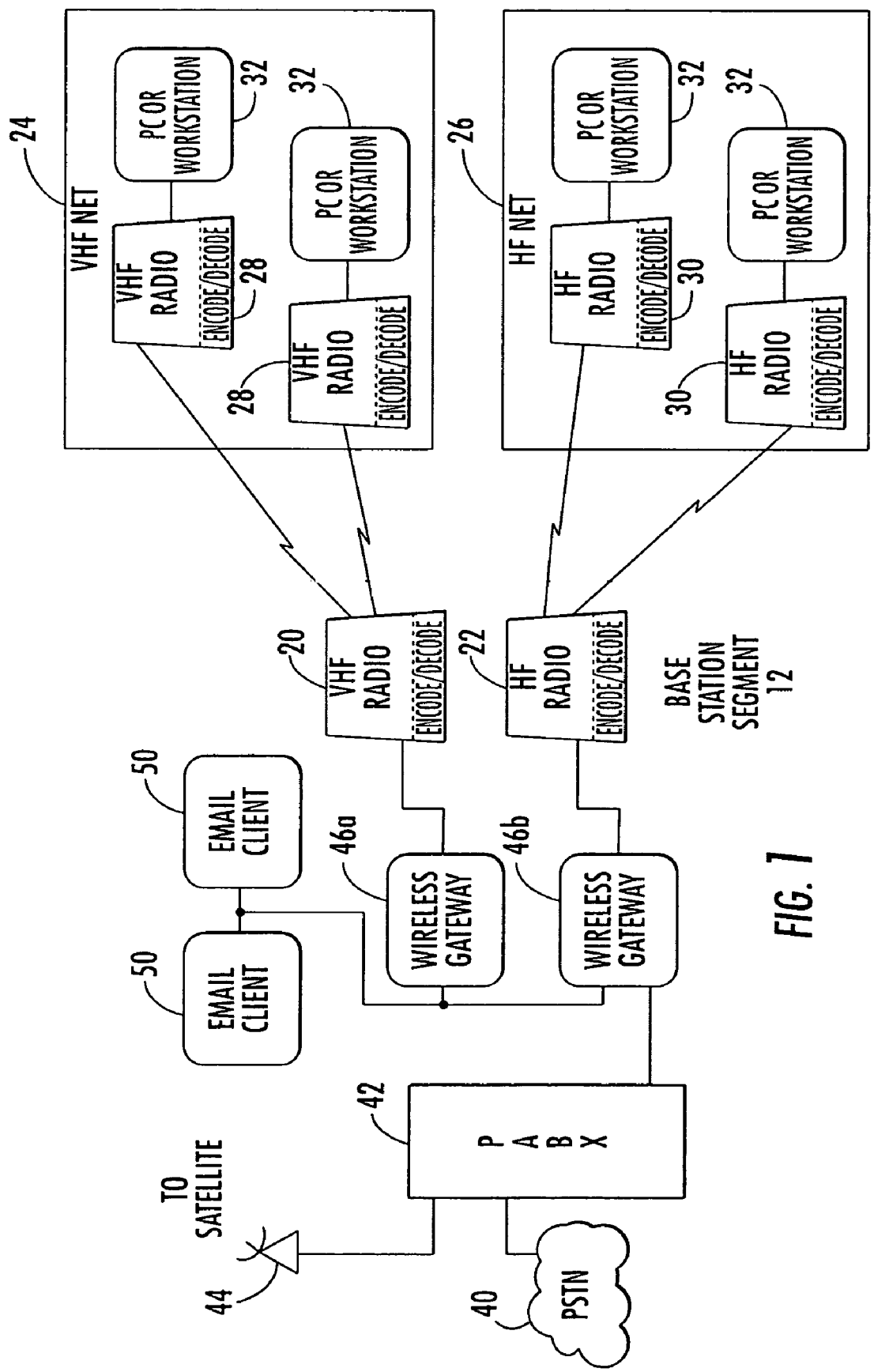
FIG. 1 is a block diagram of the communications system that could be used with the present invention as a non-limiting example.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is applicable to communication systems and products in general and particularly systems that require modulation schemes that occupy a fixed bandwidth channel (LOS, cable or SATCOM) (fixed frequency spectrum). The present invention can take advantage of the memory (usually represented as a trellis structure) of a coded waveform (i.e., PSK, ASK, FSK, QAM, or CPM with a convolutional (or other type) code) with a novel technique to increase the bandwidth of the signal and either improve the bit error rate performance or increase the number of bits which can be encoded into a single symbol. PSK, ASK, and QAM are memoryless modulations, unless the symbols are generated by a TCM code. The present invention is applicable to constant amplitude modulations with memory such as CPM or TCM.

The present invention provides a new constant-amplitude, higher throughput and lower complexity, continuous phase modulated waveform. The data rate of a continuous phase modulated waveform can be increased without incurring a higher complexity coding scheme. It provides for a selection of bandwidth and data rate to achieve increased throughput or power efficiency. Different phase pulses, preferably formed as phased shaping pulses, can send additional data and take advantage of the constant amplitude characteristic of continuous phase modulation. Viterbi decoder complexity is not changed because the metric computation increases only by the number of different phase pulses. Bandwidth can change as a function of the pulse shape, which can either increase or decrease the bandwidth.

As is known to those skilled in the art, typically to increase data rates, the symbol alphabet is increased, for example, increasing a 2-ary to a 4-ary alphabet. To increase the data throughput of a continuous phase modulated waveform, the coding complexity and number of trellis states must also increase. For example, going from a 2-ary to a 4-ary alphabet doubles the Viterbi decoder complexity. If instead, different phase shaping pulses are used to send data, complexity does not increase significantly and bandwidth can be controlled.

It is known to those skilled in the art that there is a relationship of the h-value as the FM deviation in the continuous phase modulated equation to bandwidth and power efficiency. Increasing the h-value, however, does not always increase the power efficiency. If orthogonal phase pulses can be selected as a function of bit values, the symbol alphabet of the waveform can be increased.

These pulse shapes are designed to increase bandwidth and power efficiency of the modulation. Other pulse shapes could be selected based on the desired spectral and power efficiencies. For all other modulation schemes, however, the distance and resulting power efficiency decreases as a function of increasing the number of bits in the symbol alphabet and complexity must be increased to maintain the same power efficiency.

The present invention provides benefits for the joint tactical radio system waveform developments. It allows implementation of even wider bandwidth waveforms, and DSSS/CDMA modulation schemes are easier to implement in existing manpack/hand-held radio architectures because of reduced complexity. Different families of adaptable throughput waveforms can be designed without affecting Viterbi design or complexity. For example, the same demodulator and tracker can be used for the entire set of modulation schemes. A branch metric correlator could be designed to accept all expected pulse shapes.

FIG. 1 is a high level block diagram of a communications system 10 that includes a base station segment 12 and wireless message terminals that could be modified for use with the present invention. The base station segment 12 includes a VHF radio 20 and HF radio 22 that communicate and transmit voice or data over a wireless link to a VHF net 24 or HF net 26, each which include a number of respective VHF radios 28 and HF radios 30, and personal computer workstations 32 connected to the radios 28, 30. The base station segment 12 includes a landline connection to a public switched telephone network (PSTN) 40, which connects to a PABX 42. A satellite interface 44 such as a satellite ground station, connects to the PABX 42, which connects to processors forming wireless gateways 46a, 46b. These interconnect to the VHF radio 20 or HF radio 22, respectively. The processors are connected through a local area network to the PABX 42 and e-mail clients 50. The radios include appropriate signal generators and modulators.

An Ethernet/TCP-IP local area network could operate as a "radio" mail server. E-mail messages could be sent over radio links and local air networks using STANAG-5066 as second-generation protocols/waveforms (the disclosure which is hereby incorporated by reference in its entirety) and, of course, preferably with the third-generation interoperability standard: STANAG-4538. An interoperability standard FED-STD-1052 (the disclosure which is hereby incorporated by reference in its entirety) could be used with legacy wireless devices. Examples of equipment that can be used in the present invention include different wireless gateway and radios manufactured by Harris Corporation of Melbourne, Florida. This equipment could include RF5800, 5022, 7210, 5710, 5285 and PRC 117 and 138 series equipment and devices as non-limiting examples.

It is well known to those skilled in the art that continuous phase modulation (CPM) uses a constant envelope signal with inherent memory to create a bandwidth efficient waveform. The pulse shapes defined for CPM modulation influence the bandwidth, demodulation complexity, and power efficiency and can be spread across multiple symbols. The present invention can use a family of pulse shapes, which add parallel branches to the existing CPM trellis. The resulting modulation scheme maintains the power efficiency of the underlying modulation while increasing the data rate of the waveform. The spectral efficiency is not affected by the increase in data rate while the receiver complexity is reduced. The present invention allows the phase pulse addition to effect bandwidth, power efficiency, and receiver complexity. Optimal pulse shapes can be produced and various generation methods can be used. The spectral and power efficiencies of a resulting M-ary waveform are compared to an equivalent, standard CPFSK modulation to show the advantages of the present invention. The M-ary aspect of waveform can be differentiated with the M-ary number of phase pulses. M is used for both.

It is also known that continuous phase modulation (CPM) is a constant envelope modulation with a time domain representation of:

$$s(t) = \sqrt{2E/T} \cos\left(2\pi f t + 2\pi \sum_{i=0}^{n} \alpha_i h_i q(t - iT)\right)$$

where T is the symbol period, E is the energy per symbol, f is the carrier frequency, $\alpha$ is the data symbol, h is the modulation index, and q is the phase pulse shape.

All of the parameters in the summation term have an effect on the bandwidth and trellis structure of the transmitted signal. To transmit more bits per symbol, the number of a values increases (as does the value of $\alpha$) and the transmitted signal has a resulting increase in complexity. Consequently the (normalized) power efficiency increases as the bandwidth also increases leaving the spectral efficiency unchanged. If it is desired to reduce the bandwidth, the h-value can be decreased, which would result in degradation to the power efficiency. Another option for CPM modulation would take advantage of the phase pulse to modify the bandwidth of the modulated signal. With rectangular (linear) pulse shaping the CPM waveform is denoted as 1REC CPM or CPFSK. The pulse shapes can be varied, however, with a resulting change to bandwidth and power efficiency. Typically the h-value is increased to improve performance at the cost of spectral efficiency. It has been demonstrated, however, that there are limitations to this approach and the optimal power efficiency is not always achieved with the larger h-value.

If, however, the pulse shape as a way to increase the number of bits per symbol (i.e., increase the symbol alphabet), then information content can be carried in the pulse. Thus, for an increase from a binary to a 4-ary symbol, one of the symbol bits could be contained in the $\alpha$-value and two different pulse shapes would be required for the other bit.

With pulse shaping, the trellis structure of the basis (CPM) waveform is unaffected and the hybrid waveform has the same trellis structure as standard CPM. The metric computation of the hybrid waveform must be modified to correlate for the hybrid's resulting in-phase and quadrature signals and provide a best-parallel-path branch metric to the Maximum Likelihood Decoder.

Figure 2:
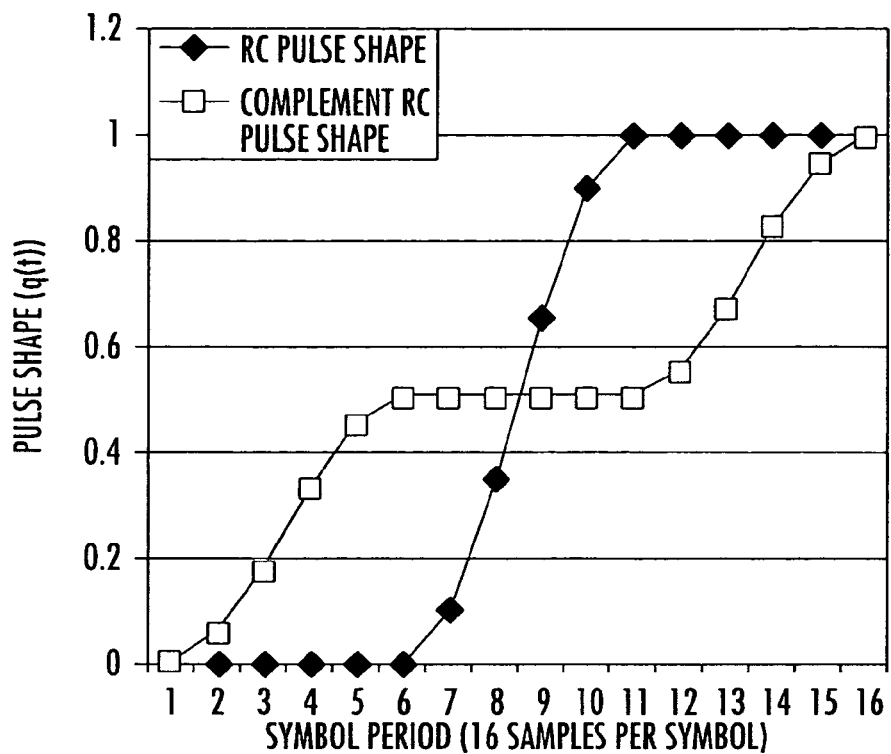
FIG. 2 is a graph showing a raised cosine pulse shape and its complement, in accordance with the present invention.

One simple example of pulse shape diversity would use a raised cosine pulse and its complement. As shown in FIG. 2, the frequency content of the signal is higher than a linear (LREC) CPM signal because the phase pulse is zero-valued for a portion of the symbol time. The resulting CPM signal will have a wider bandwidth than the baseline MSK signal and a higher bit rate.

The resulting power efficiency can be greater. For example, the 1E-5 point (Eb/No) is 18.5 dB. All bit errors occur on the parallel branches. Inspection of the branch metric computations (cross-correlation of the transmit signal with all possible combinations of candidate pulse shapes from all possible starting phase positions) shows that the two pulse shapes do not result in in-phase and quadrature signals with good cross-correlation properties. In some cases, a transmit signal is highly correlated with a slightly rotated version of an incorrect candidate.

Figure 3:
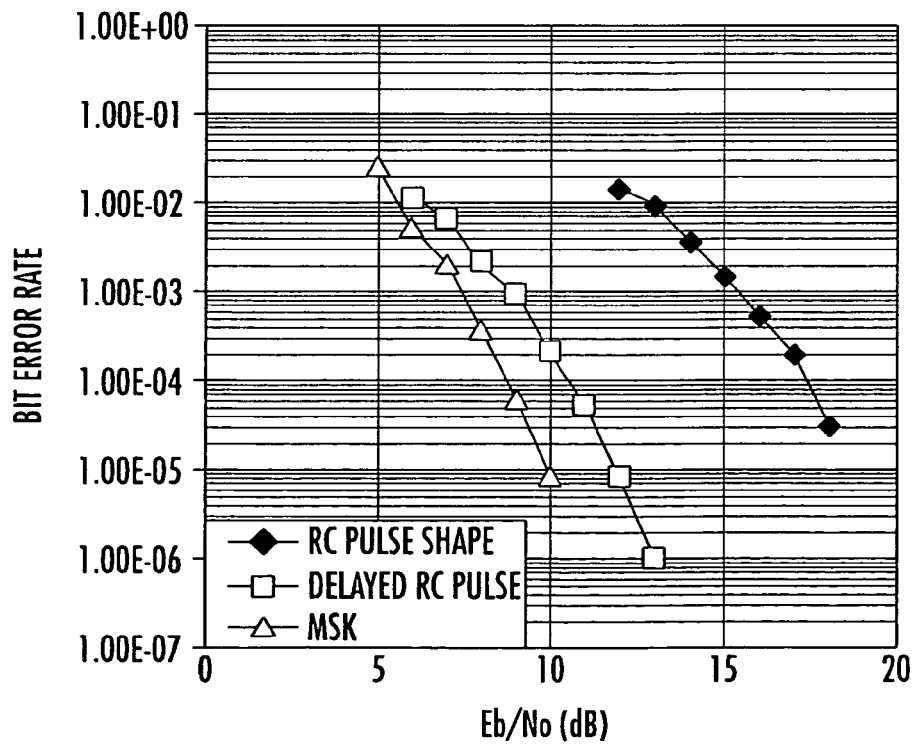
FIG. 3 is a graph showing the bit error rate for two forms of raised cosine pulses, in accordance with the present invention.

To improve performance, the in-phase and quadrature signals that result from the closest pulse shapes should have the highest possible Euclidean distance separation as is possible. One method to improve this distance would be to modify the first pulse to change from 0 to 1 at the start of the symbol while the second pulse would change from 0 to 1 at the end of the symbol. An in-phase and quadrature plot of the transmitted signal would show that a phase rotation from 0 to 90 degrees (for example) would occur at the start of the symbol, for the first phase pulse, while the second phase pulse would hold off the phase rotation to the end of the symbol. Thus, the Euclidean distance would approach the value $\sqrt{2}$. The performance of these pulse shapes does improve the bit error rate performance and the curves are shown in FIG. 3.

Figure 4:
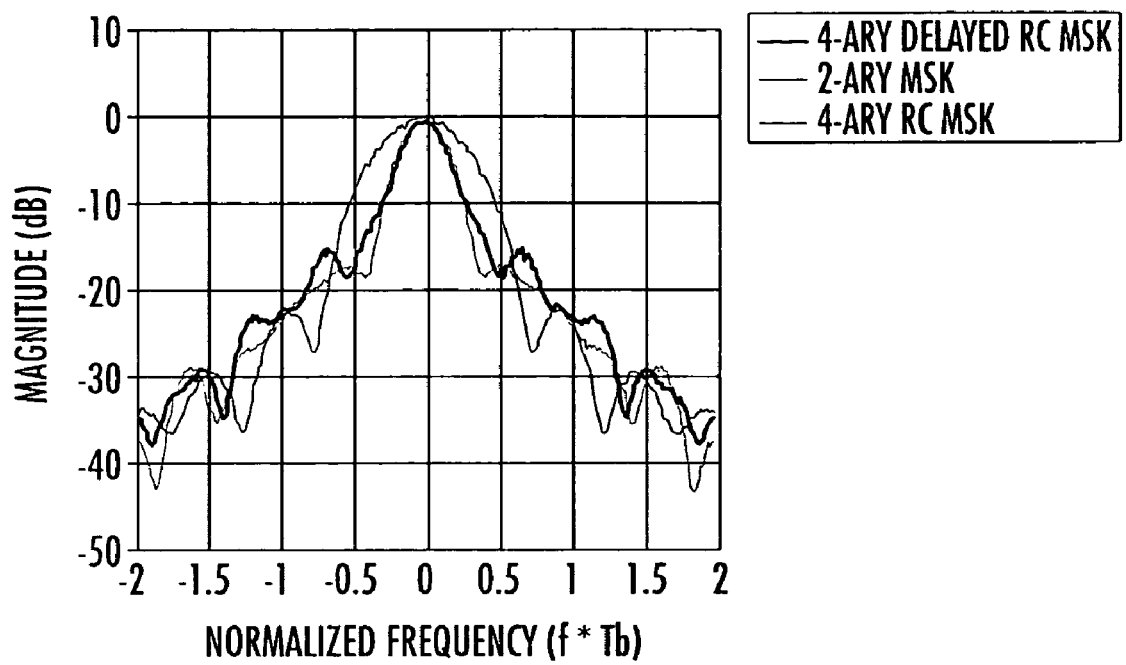
FIG. 4 is a graph showing the spectral comparison of raised cosine pulse shapes to standard MSK, in accordance with the present invention.

The pulse shapes modify the spectrum of the APS MSK signal and are shown in FIG. 4.

The spectra have been normalized to reflect the difference in bit rate between the three modulation types, i.e., the symbol rates are modified so that all waveforms provide the same data rate. The delayed and raised cosine shape has approximately the same bandwidth as the original pulse shape with a dramatic improvement in bit error rate performance. The main lobe of the raised cosine pulses is much smaller than the MSK standard and the 90% power bandwidth of the two signals is 0.5 for the original and 0.64 for the delayed version. MSK has a 0.75 value at that point. At 99%, however, MSK has the advantage and has a value of 1.2 while the raised cosine signals are at 1.8 and 2.1 respectively. It is possible to filter the signal around the main lobe and have a signal with better spectral efficiency than MSK.

Figure 5:
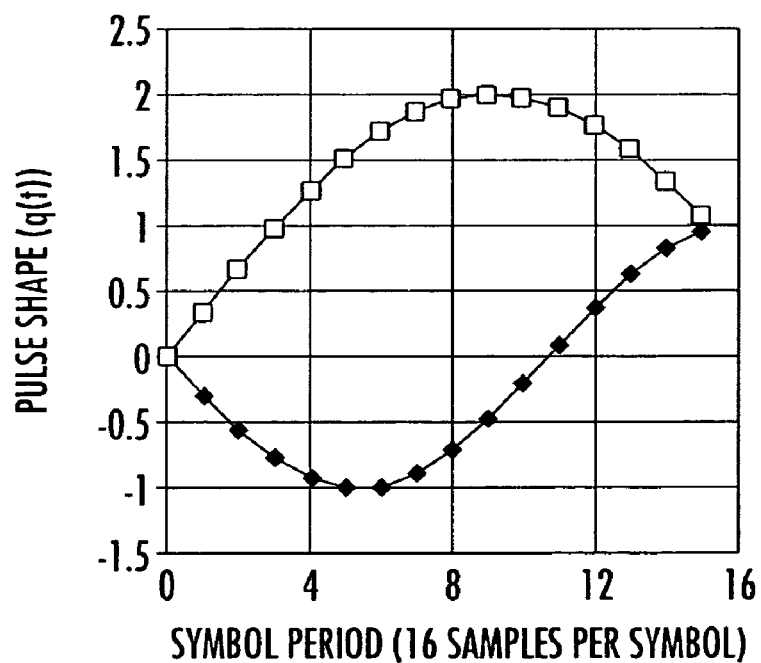
FIG. 5 is a graph showing aggressive pulse shapes, in accordance with the present invention.

The Euclidean distance is improved through pulse shape modification. Some pulse shapes could improve on the Euclidean distance of the baseline MSK signal by generating in-phase and quadrature signals that are greater than the $\sqrt{2}$ distance apart. As shown in FIG. 5, the pulse shapes have inverted frequency components, which initially move the in-phase and quadrature signals at opposite ends of the signal constellation.

Figure 6:
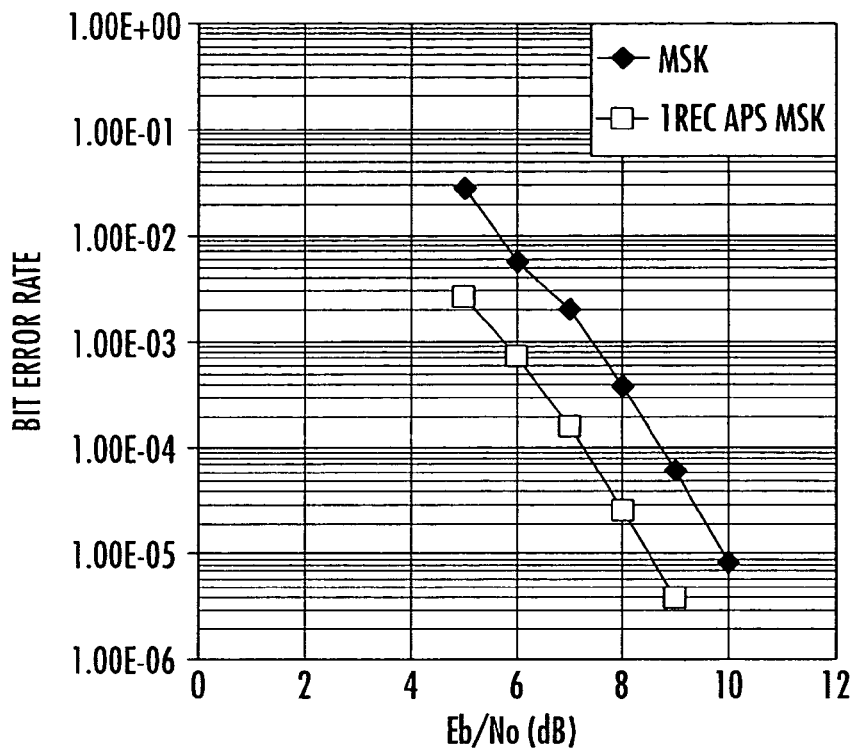
FIG. 6 is a graph showing the power efficiency of aggressive pulse-shaped MSK to standard 1REC MSK, in accordance with the present invention.

The bit error rate performance is shown in FIG. 6. With the increased branch metric distance, the power efficiency improves by just over 1 dB at the 1E-5 point on the curve.

Figure 7:
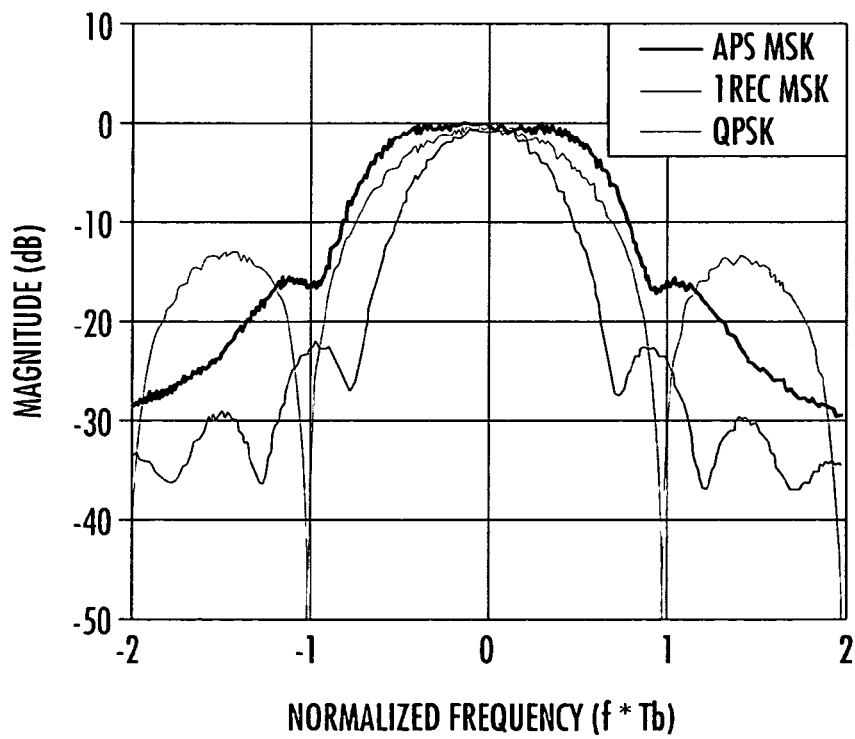
FIG. 7 is a graph showing the spectral efficiency of 4-ary aggressive pulse-shaped (APS) MSK to standard 1REC MSK, in accordance with the present invention.
Figure 8:
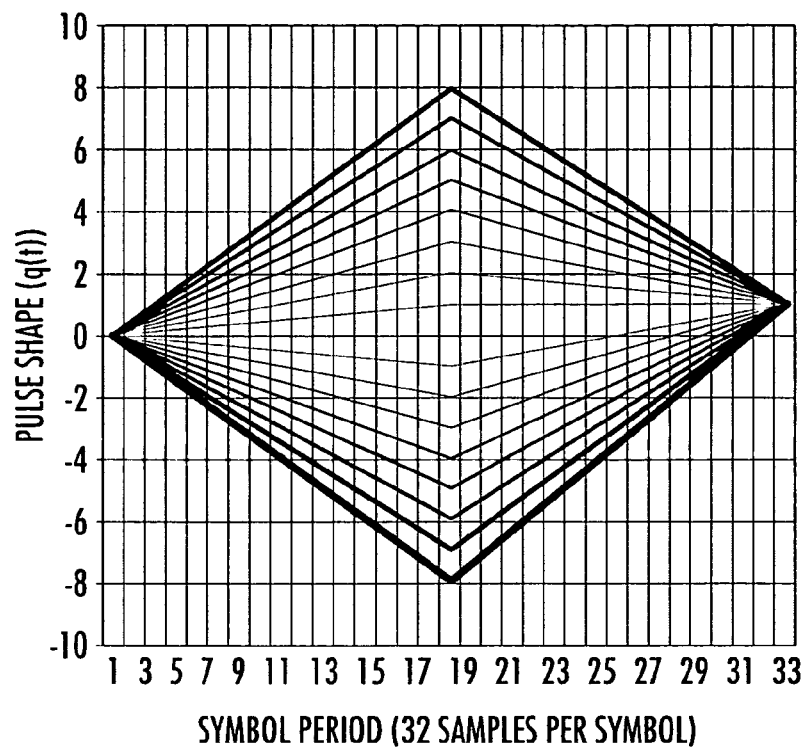
FIG. 8 is a hybrid 32-ary APS with 16 different pulse shapes, where the pulse shapes are generated with the following formula: $q(t)=\{0 \ldots (M+1) \ldots 1\}$ (for even M) and $q(t)=\{0 \ldots -(M+1) \ldots 1\}$ (for odd M) where (M=0, 1, 2 ... N-1, where N is total number of pulses), in accordance with the present invention.

The Spectral Efficiency of the Aggressive Pulse-Shaped MSK signal is shown in FIG. 7. The 90% power bandwidth for the transmitted signal is 1.3 while the 99% power bandwidth is 2.3. Based on these results, it is possible to generate other pulse shapes that would continue to improve on the bit error rate performance while reducing the bandwidth of the signal.

Several methods of automatic generation of optimal pulse shapes have been investigated. In the interest of brevity and clarity, only piece-wise linear pulses are described. There are various parameters to consider for the selection of an optimal pulse shape or family of pulse shapes. In the case where too much frequency content is added to the signal, the power efficiency is retained while the bandwidth continues to increase. In the case where the parallel paths are too close (in Euclidean distance), the spectral efficiency is improved while the power efficiency is dominated by the performance of the paths with the smallest distance.

It is possible to use an adaptive approach, which would derive the best possible set of pulse shapes for a given bandwidth and power efficiency. It is also possible to use an approximate computational approach. An initial approach could be to use one-quarter of a complete revolution around the unit circle (per symbol) for each parallel path (so a value of 1 means PI/2 radians). Using the notation of 'M' for each parallel path an equation results:

$$q(t)=\{0 \ldots (M+1) \ldots 1\} \quad \text{(for even M)}$$

$$q(t)=\{0 \ldots -(M+1) \ldots 1\} \quad \text{(for odd M)}$$

Figure 9:
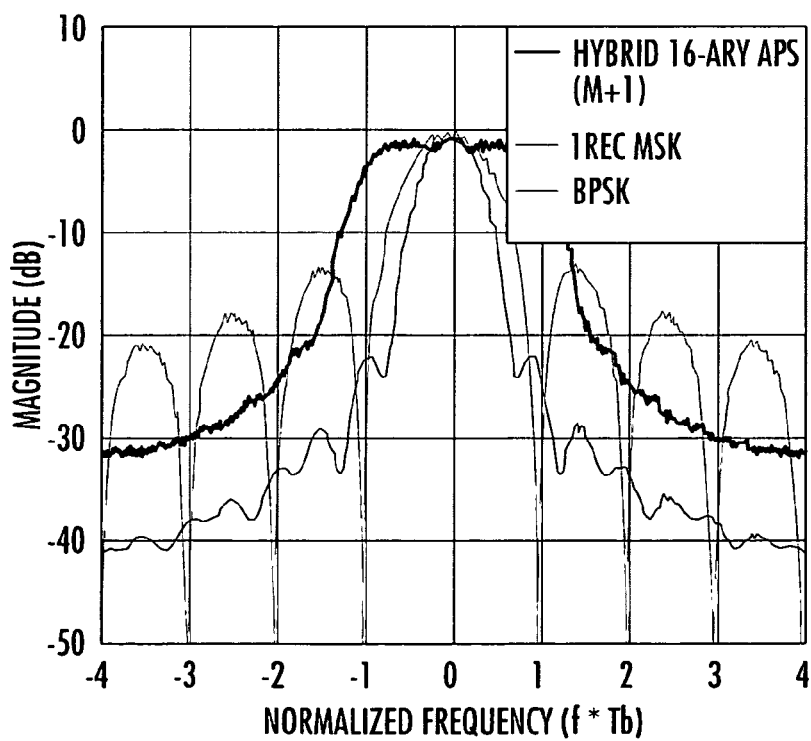
FIG. 9 is a graph showing the spectral efficiency of hybrid 16-ary APS MSK for (M+1) pulse shaping (where N=8 in formula described relative to FIG. 8, in accordance with the present invention.

The terminology shown in the above equation represents a piece-wise linear pulse which starts at 0 and traverses to the value 1 (for example if M=0) at the midpoint of the symbol and maintains that value for the second half of the symbol. The (simulated) power efficiency for a 16-ary variation of the transmitted waveform is shown to have a bit error rate of 1.7E-5 at 7.0 dB Eb/No with a graph of this spectrum shown in FIG. 9.

This family of pulse shapes can be used to generate 4-ary, 8-ary, 16-ary, 32-ary, 64-ary, and beyond modulation order signals. The power efficiency of each waveform is based on the trellis structure of the baseline CPM waveform and the distance in paths between each of the signals generated by the pulse shapes.

If it is desired to sacrifice power efficiency for spectral efficiency, another family of pulse shapes can be derived:

$$q(t)=\{0 \ldots (M+1)/2 \ldots 1\} \quad \text{(for even M)}$$

$$q(t)=\{0 \ldots -(M+1)/2 \ldots 1\} \quad \text{(for odd M)}$$

Figure 10:
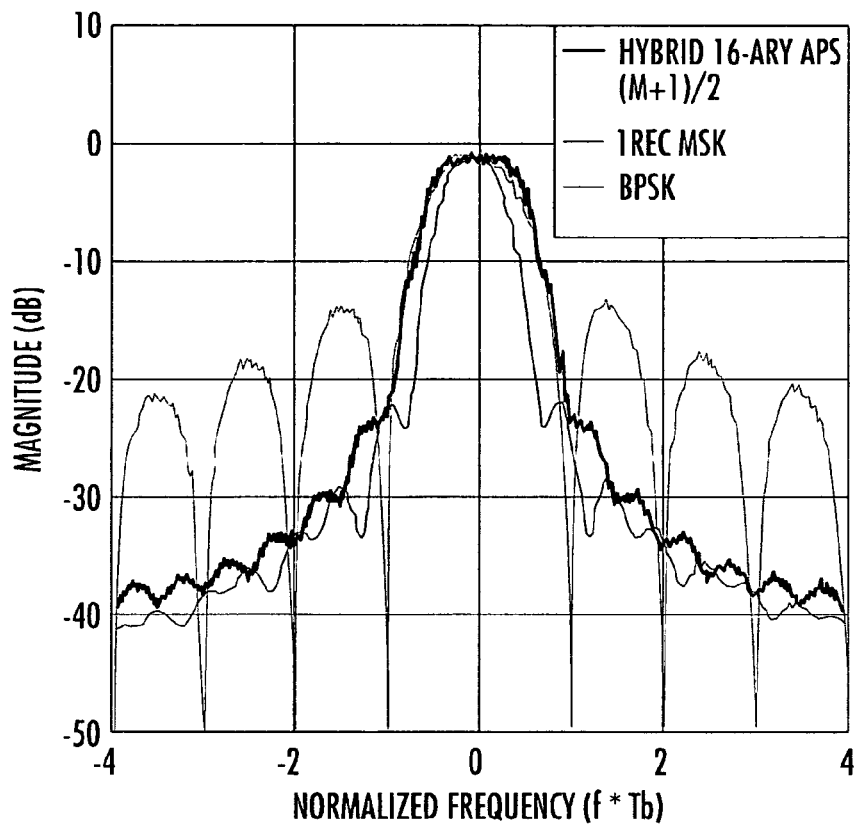
FIG. 10 is a graph showing the spectral efficiency of hybrid 16-ary APS MSK for (M+1)/2 pulse shape (where mid-point of formula described relative to FIG. 8 is replaced with (M+1)/2 and -(M+1)/2 respectively), in accordance with the present invention.

This transmitted waveform, which results from this family of pulse shapes, results in a bit error rate of 1E-5 at 10.2 dB Eb/No with the spectrum shown in the graph FIG. 10. The spectrum shown has a 90% power bandwidth of 1.1 and 99% power bandwidth of 1.7.

In this family of pulse shapes, the distribution of distance throughout each of the possible parallel paths is not perfect. The power efficiency for the lower-order (4-ary and 8-ary) waveforms is degraded because of failures (bit errors) on the closest two pulse shapes.

Figure 11:
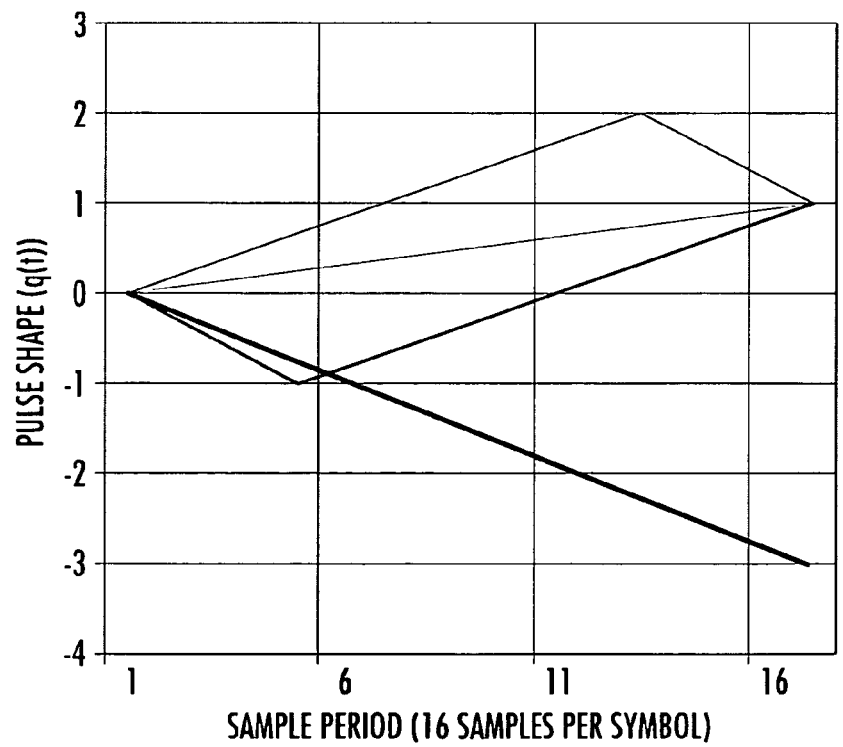
FIG. 11 is a graph showing a pulse shape for 8-ary APS MSK, in accordance with the present invention.

To reduce bandwidth, the pulse shapes could be designed to recognize the boundaries of the unit circle and, if the unit circle is crossed, it is only necessary to return to the nearest mod(2*PI) boundary of the unit circle at the point of the destination phase angle. Another important modification would include moving the peak point of the pulse shape to another point of the symbol. The family of pulse shapes shown in FIG. 11 illustrates this movement.

Figure 12:
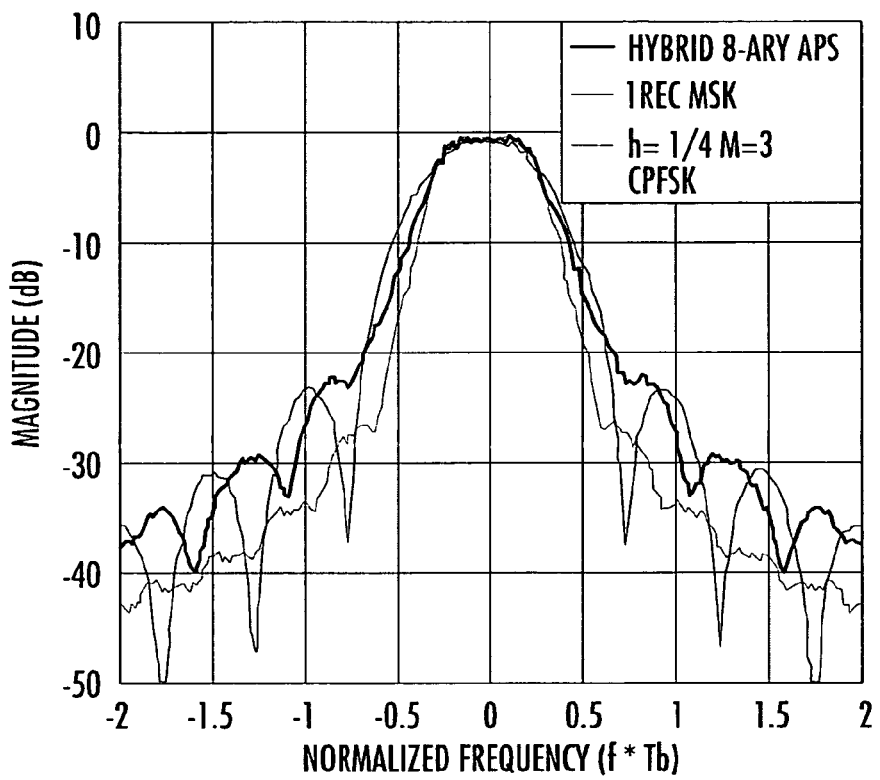
FIG. 12 is a graph showing the spectral efficiency comparison of 8-ary APS MSK to standard MSK and CPFSK, in accordance with the present invention.

The spectrum for the 8-ary APS MSK waveform is shown in FIG. 12. For the APS waveform, the 90% power bandwidth is 0.66 and the 99% power bandwidth is within 1.27. This is comparable to the standard h=¼ M=3 (8-ary) CPFSK waveform, which is shown to have a 90% power bandwidth of 0.57 and a 99% power bandwidth of 0.90.

Figure 13:
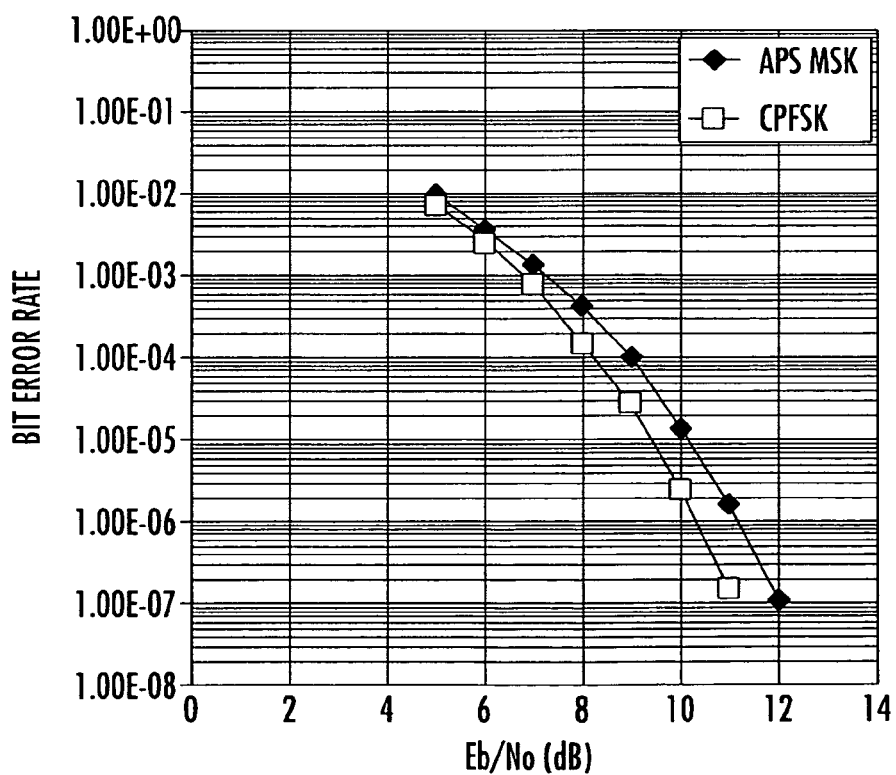
FIG. 13 is a graph showing a comparison of 8-ary APS MSK to CPFSK, in accordance with the present invention.

Likewise, the power efficiency of the two waveforms (CPFSK and 8-ary APS MSK) is comparable as shown in FIG. 13. The power efficiency of the two 8-ary waveforms is roughly equivalent with the APS MSK 1 dB worse at the 1E-5 bit error rate.

The major difference between the two waveforms is the complexity of the trellis structure. The CPFSK trellis has 8-states while the APS MSK waveform maintains the 2-state trellis structure of the baseline MSK waveform. The APS MSK has some complexity built in to the branch metric calculation but, with the current state of DSP and FPGA technology, the correlations required for branch metric calculation and optimization is well understood thus further reducing complexity.

The pulse shape selection for each pair of bits (00, 01, 10, and 11) can be gray-coded to reduce the bit error rate performance of waveform. For a 4-ary modulation scheme, the resulting bit error rate curve is improved by a factor of two due to the gray code.

Continuous phase modulated waveforms are ubiquitous and the pulse shape technique of the present invention allows a designer another degree of freedom in the design of a communications waveform. CPM demodulation complexity is a limitation to many systems designers and the present invention can tailor power and spectral efficiency of the CPM signal without greatly affecting the demodulation complexity.

Pulse shape diversity increases the complexity of the branch metric calculations over that of the standard CPM/CPFSK optimized calculations. However, the correlations performed in branch metric computations are naturally calculated as multiply-accumulate operations in Digital Signal Processors and FPGA's and the optimization of those calculations has been covered in the literature. The path metric computations calculated as part of the maximum likelihood decoding are only affected by the order of the modulation, which is the same for any modulation scheme. The designer has the ability to reduce the symbol rate of the hybrid CPM modulation, meet the same bandwidth requirements as the standard modulation, and reduce computation complexity because of the lowered symbol rate.

There is no limit to the number of orthogonal signals, which can be used to increase the order of the modulation of the underlying CPM waveform. At extreme limits, wideband waveforms could be generated which have the power efficiency of the underlying CPM waveform with similar computation efficiency as compared to a CDMA waveform with the same chip rate.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for forming a signal with memory, which comprises:
    a signal generator for generating a continuous phase waveform with phase memory having a phase trellis structure; and
    a modulator operative with the signal generator for adding at least one phase pulse to the phase trellis structure of the continuous phase waveform to create a substantially constant envelope modulated signal that increases the bits per transmitted symbol.

2. A system according to claim 1, wherein the phase pulse comprises at least two pseudo-orthogonal phase pulses.

3. A system according to claim 1, wherein the phase pulse has a shape that increases the correlation metric difference between pulse shapes.

4. A system according to claim 1, wherein the modulator is operative for generating multiple phase pulses that convey a transmitted message.

5. A system according to claim 1, wherein said phase pulse comprises a raised cosine phase pulse and complement.

6. A system according to claim 5, wherein said phase pulse is zero-valued for a portion of the symbol time.

7. A system according to claim 1, wherein the modulator is operative for modifying a first pulse to change from 0 to 1 at the start of a symbol and changing a second pulse from 0 to 1 at the end of a symbol.

8. A system according to claim 1, wherein the phase pulse has a shape that increases the correlation metric difference a Euclidian distance separation greater than the square root of two.

9. A system for forming a signal with memory, which comprises:
    a signal generator for generating a continuous phase waveform with phase memory having a phase trellis structure; and
    a modulator operative with the signal generator for adding at least one phase pulse to the phase trellis structure of the continuous phase waveform to create a substantially constant envelope modulated signal that increases the transmitted bits per symbol, wherein the phase pulse increases the correlation metric difference between pulse shapes such that multiple phase pulses convey a transmitted message.

10. A system according to claim 9, wherein the phase pulse comprises at least two pseudo-orthogonal phase pulses.

11. A system according to claim 9, wherein the phase pulse traverses to a value at a midpoint of a symbol.

12. A system according to claim 9, wherein the phase pulse maintains a value for about a second half of a symbol.

13. A system according to claim 9, wherein the modulator is operative for increasing from a binary symbol.

14. A system according to claim 9, wherein said phase pulse comprises a raised cosine phase pulse and complement.

15. A system according to claim 14, wherein said phase pulse is zero-valued for a portion of the symbol time.

16. A system according to claim 9, wherein the modulator is operative for modifying a first pulse to change from 0 to 1 at the start of a symbol and changing a second pulse from 0 to 1 at the end of a symbol.

17. A system according to claim 9, wherein the phase pulse has a shape that increases the correlation metric difference a Euclidian distance separation greater than the square root of two.

18. A method of communicating data, which comprises:
    generating at a signal generator a communications signal as a continuous phase waveform with phase memory having a phase trellis structure and containing communications data; and
    modulating the communications signal and adding at least one phase pulse to the phase trellis structure of the continuous phase waveform to create a substantially constant envelope modulated signal that increases the transmitted bits per symbol.

19. A method according to claim 18, which further comprises adding at least two pseudo-orthogonal phase pulses.

20. A method according to claim 18, which further comprises generating a phase pulse that increases the correlation metric difference between pulse shapes.

21. A method according to claim 18, which further comprises generating multiple phase pulses that convey a transmitted message.

22. A method according to claim 18, which comprises adding a raised cosine phase pulse and complement.

23. A method according to claim 22, wherein the phase pulse is zero-valued for a portion of the symbol time.

24. A method according to claim 18, which further comprises modifying a first pulse to change from 0 to 1 at the start of a symbol and changing a second pulse from 0 to 1 at the end of a symbol.

25. A method according to claim 18, which further comprises adding a phase pulse that has a shape that increases the correlation metric difference a Euclidian distance separate greater than the square root of two.

26. A method of communicating data, which comprises:
generating at a signal generator a communications signal as a continuous phase waveform with phase memory having a phase trellis structure and containing communications data; and
modulating the communications signal and adding at least one phase pulse to the phase trellis structure of the continuous phase waveform to create a substantially constant envelope modulated signal that increases the transmitted bits per symbol and has a phase pulse that increases the correlation metric difference between pulse shapes such that multiple phase pulses convey a transmitted message.

27. A method according to claim 26, which further comprises adding at least two pseudo-orthogonal phase pulses.

28. A method according to claim 26, which comprises adding a raised cosine phase pulse and complement.

29. A method according to claim 26, wherein the phase pulse is zero-valued for a portion of the symbol time.

30. A method according to claim 26, which further comprises modifying a first pulse to change from 0 to 1 at the start of a symbol and changing a second pulse from 0 to 1 at the end of a symbol.

31. A method according to claim 26, which further comprises adding a phase pulse that has a shape that increases the correlation metric difference a Euclidian distance separation greater than the square root of two.

32. A system for forming a signal with memory, which comprises:
a signal generator for generating a coded waveform or a waveform with memory having a trellis structure; and
a modulator operative with the signal generator for adding at least one phase pulse to the trellis structure of the coded or memory waveform to create a substantially constant envelope modulated signal that increases the bits per transmitted symbol, wherein the modulator is operative for modifying a first pulse to change from 0 to 1 at the start of a symbol and changing a second pulse from 0 to 1 at the end of a symbol.

33. A method of communicating data, which comprises:
generating at a signal generator a communications signal as a coded waveform or waveform with memory having a trellis structure containing communications data;
modulating the communications signal and adding at least one phase pulse to the trellis structure of the coded or memory waveform to create a substantially constant envelope modulated signal that increases the transmitted bits per symbol; and
modifying a first pulse to change from 0 to 1 at the start of a symbol and changing a second pulse from 0 to 1 at the end of a symbol.

34. A method of communicating data, which comprises:
generating at a signal generator a communications signal as a coded waveform or waveform with memory having a trellis structure containing communications data;
modulating the communications signal and adding at least one phase pulse to the trellis structure of the coded or memory waveform to create a substantially constant envelope modulated signal that increases the transmitted bits per symbol; and
adding a phase pulse that has a shape that increases the correlation metric difference a Euclidian distance separation greater than the square root of two.

35. A system for forming a signal with memory, which comprises:
a signal generator for generating a coded waveform or a waveform with memory having a trellis structure; and
a modulator operative with the signal generator for adding at least one phase pulse to the trellis structure of the coded or memory waveform to create a substantially constant envelope modulated signal that increases the bits per transmitted symbol, wherein the phase pulse has a shape that increases the correlation metric difference a Euclidian distance separation greater than the square root of two.

* * * * *